US012769702B2

(12) United States Patent
Denduluri et al.

(10) Patent No.: US 12,769,702 B2
(45) Date of Patent: *Oct. 20, 2026

(54) IMPLEMENTING ASYMMETRIC PROCESSOR CORES TO ENABLE HIGHER OPERATING FREQUENCIES IN PROCESSOR-BASED DEVICES

(71) Applicant: QUALCOMM Incorporated, San Diego, CA (US)

(72) Inventors: Raghava Rao Denduluri, Cupertino, CA (US); Conrado Blasco, San Mateo, CA (US); Nitin Makhija, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 138 days.

This patent is subject to a terminal disclaimer.

(21) Appl. No.: 18/677,311

(22) Filed: May 29, 2024

(65) Prior Publication Data

US 2025/0199997 A1 Jun. 19, 2025

Related U.S. Application Data

(63) Continuation of application No. 18/545,361, filed on Dec. 19, 2023.

(51) Int. Cl.
*G06F 1/08* (2006.01)
*G06F 15/80* (2006.01)

(52) U.S. Cl.
CPC ................ *G06F 15/80* (2013.01); *G06F 1/08* (2013.01)

(58) Field of Classification Search
CPC .................................. G06F 15/80; G06F 1/08
See application file for complete search history.

(56) References Cited

U.S. PATENT DOCUMENTS 5,802,287 A * 9/1998 Rostoker .............. H04L 49/901 370/395.5
6,963,990 B2 * 11/2005 Allen ................. G06F 13/4027 713/600

(Continued)

OTHER PUBLICATIONS

International Search Report and Written Opinion for International Patent Application No. PCT/US2024/055453, mailed Feb. 5, 2025, 15 pages.

*Primary Examiner* — Zahid Choudhury
(74) *Attorney, Agent, or Firm* — W&T

(57) ABSTRACT

Implementing asymmetric processor cores to enable higher operating frequencies in processor-based devices is disclosed herein. In some aspects, a processor-based device provides a core cluster that comprises a plurality of processor cores and a corresponding phase-locked loop (PLL). Each processor core is based on a common instruction set architecture (ISA) and is configured to operate synchronously based on a same clock signal from the PLL of the core cluster. A first subset of processor cores within the core cluster is implemented with a different physical characteristic relative to a second subset of processor cores within the core cluster, wherein the different physical characteristic enables each processor core of the first subset of processor cores to operate at a higher operating frequency than each processor core of the second subset of processor cores.

19 Claims, 7 Drawing Sheets

(56) References Cited

U.S. PATENT DOCUMENTS

| | | | | |
|---|---|---|---|---|
| 7,496,780 | B2 * | 2/2009 | Abel | H04J 3/04 370/503 |
| 10,496,141 | B2 * | 12/2019 | Lee | G06F 1/3243 |
| 2010/0231282 | A1 | 9/2010 | Singasani | |
| 2011/0213998 | A1 | 9/2011 | Mathieson et al. | |
| 2014/0173311 | A1 | 6/2014 | Park et al. | |
| 2016/0062447 | A1 * | 3/2016 | Hsu | G06F 1/3243 713/300 |
| 2017/0147054 | A1 * | 5/2017 | Abu Salah | G06F 1/3293 |
| 2019/0041966 | A1 | 2/2019 | Rotem et al. | |
| 2019/0095216 | A1 | 3/2019 | Henry et al. | |
| 2020/0042065 | A1 | 2/2020 | Ananthakrishnan et al. | |
| 2023/0122955 | A1 | 4/2023 | Mylius et al. | |
| 2023/0195199 | A1 | 6/2023 | Chidambaram et al. | |
| 2023/0315141 | A1 * | 10/2023 | Jain | G06F 1/06 327/291 |
| 2024/0201730 | A1 * | 6/2024 | Boecker | G06F 1/10 |
| 2025/0199996 | A1 | 6/2025 | Denduluri et al. | |

* cited by examiner

IMPLEMENTING ASYMMETRIC PROCESSOR CORES TO ENABLE HIGHER OPERATING FREQUENCIES IN PROCESSOR-BASED DEVICES

PRIORITY APPLICATION

The present application is a continuation of and claims priority to U.S. patent application Ser. No. 18/545,361, filed Dec. 19, 2023 and entitled "IMPLEMENTING ASYMMETRIC PROCESSOR CORES TO ENABLE HIGHER OPERATING FREQUENCIES IN PROCESSOR-BASED DEVICES," which is incorporated herein by reference in its entirety.

BACKGROUND

I. Field of the Disclosure

The technology of the disclosure relates generally to physical implementation of multicore processor-based devices, and, in particular, to implementing clusters of processor cores of a processor-based device.

II. Background

Conventional processor-based devices may be implemented as multiple processor cores that are organized into core clusters. Each core cluster may be "synchronous," in that all processor cores of the core cluster are clocked using a single clock source such as a phase-locked loop (PLL). Because the processor cores all share the same clock source, a change in frequency for a synchronous core cluster affects all of the active processor cores within the core cluster. The processor cores in the core cluster also may be implemented using a shared Level 2 (L2) microarchitecture in which the processor cores are connected to, and share, a single L2 cache.

The core clusters of a processor-based device can be physically implemented using individual blocks that are each built separately and then connected or "stitched" together on-die. For example, each processor core may be physically implemented by stitching a separately built instruction fetch unit block to a separately built rename unit block, and so on in similar fashion for each processor core unit. After each processor core is built, a core cluster can be physically implemented by stitching together multiple identical pre-built processor cores along with a pre-built L2 cache. Because the run time of physical implementation tools is directly related to the size of each block, using smaller blocks that are subsequently stitched together enables quicker design turnaround, at the cost of limited inter-block optimizations by the physical implementation tools.

Optimization of core clusters such as those described above may be based on contradictory goals. In scenarios in which only one processor core in the core cluster is active (i.e., turned on), it is desirable to enable higher peak performance by the processor core by optimizing the processor core to reach relatively higher clock frequencies (e.g., by using gates that are higher-performing but less energy-efficient). When all processor cores in the core cluster are active, though, it is desirable to enable higher multi-thread performance by the core cluster. In multi-thread scenarios, the processor cores may operate at a lower clock frequency than the maximum peak clock frequency due to considerations such as voltage drop, rate of change of current, and thermal issues. Moreover, multi-thread scenarios may also contend with power constraints that make energy efficiency a greater concern.

Accordingly, mechanisms for providing both higher peak performance and improved energy efficiency relative to existing approaches are desirable.

SUMMARY OF THE DISCLOSURE

Aspects disclosed in the detailed description include implementing asymmetric processor cores to enable higher operating frequencies in processor-based devices. Related apparatus, methods, and computer-readable media are also disclosed. In this regard, a processor-based device provides a plurality of core clusters that each comprise a plurality of processor cores and a corresponding phase-locked loop (PLL). Each processor core is based on a common instruction set architecture (ISA) and is configured to operate synchronously based on a same clock signal from the PLL of the corresponding core cluster. A first subset of processor cores within each core cluster is implemented with a different physical characteristic relative to a second subset of processor cores within the core cluster, wherein the different physical characteristic enables each processor core of the first subset of processor cores to operate at a higher operating frequency than each processor core of the second subset of processor cores. Because the first subset of processor cores physically differs from the second subset of processor cores, the processor cores of each core cluster are said to be "asymmetric." The use of asymmetric processor cores enables the processor-based device to maximize processor performance when only processor cores within the first subset are active, while also improving energy efficiency when processor cores within the second subset are also active.

In some aspects, the different physical characteristic of the first subset of processor cores comprises a clock path between each of the first subset of processor cores and the PLL that is faster than a clock path between each of the second subset of processor cores and the PLL. This may be implemented in some such aspects by, e.g., physically locating the PLL closer to the first subset of processor cores than the second subset of processor cores. Some aspects may provide that each processor core of first subset of processor cores is implemented with the different physical characteristic by being optimized to operate at a first minimum voltage/frequency operating point and a first maximum voltage/frequency operating point that are higher than a second minimum voltage/frequency operating point and a second maximum voltage/frequency operating point, respectively, of the second subset of processor cores. In such aspects, the first maximum voltage/frequency operating point may correspond to a peak single-thread frequency, while the second maximum voltage/frequency operating point corresponds to a peak multi-thread frequency that is lower than the peak single-thread frequency.

According to some aspects, the different physical characteristic of the first subset of processor cores comprises a first plurality of library cells optimized for higher frequency, while each processor core of the second subset of processor cores is implemented using a second plurality of library cells optimized for energy efficiency. In some aspects, the different physical characteristic of the first subset of processor cores comprises a plurality of block head switches (BHS), while the second plurality of library cells is implemented using a plurality of globally distributed head switches (GDHS).

In exemplary operation, the processor-based device is configured to determine (e.g., using a dynamic voltage and frequency scaling (DVFS) circuit) of the core cluster) that only one or more of the processor cores of the first subset are active among the plurality of processor cores. In response to determining that only the one or more processor cores of the first subset are active among the plurality of processor cores, the DVFS circuit of the core cluster switches the core cluster from a first DVFS state to a second DVFS state higher than the first DVFS state. In some aspects, the DVFS circuit may subsequently determine that one or more of the processor cores of the second subset of processor cores has become active. In response, the DVFS circuit in such aspects switches the core cluster to a third DVFS state lower than the second DVFS state.

In another aspect, a processor-device is provided. The processor-based device comprises a core cluster that includes a PLL and a plurality of processor cores based on a common ISA. Each processor core of the plurality of processor cores is configured to operate synchronously based on a same clock signal from the PLL. The plurality of processor cores comprises a first subset of processor cores and a second subset of processor cores, wherein each processor core of the first subset of processor cores is implemented with a different physical characteristic relative to the second subset of processor cores, and the different physical characteristic enables a higher operating frequency of each processor core of the first subset of processor cores than that of each processor core of the second subset of processor cores.

In another aspect, a processor-based device is provided. The processor-based device comprises means for determining that only one or more processor cores of a first subset of processor cores of a plurality of processor cores of a core cluster of a processor-based device are active among the plurality of processor cores, wherein the core cluster comprises a PLL; the plurality of processor cores are based on a common ISA; each processor core of the plurality of processor cores is configured to operate synchronously based on a same clock signal from the PLL; the plurality of processor cores comprises the first subset of processor cores and a second subset of processor cores; each processor core of the first subset of processor cores is implemented with a different physical characteristic relative to the second subset of processor cores; and the different physical characteristic enables a higher operating frequency of each processor core of the first subset of processor cores than that of each processor core of the second subset of processor cores. The processor-based device further comprises means for switching the core cluster from a first DVFS state to a second DVFS state higher than the first DVFS state, responsive to determining that only the one or more processor cores of the first subset are active among the plurality of processor cores.

In another aspect, a method for implementing asymmetric processor cores is provided. The method comprises determining, by a processor-based device, that only one or more processor cores of a first subset of processor cores of a plurality of processor cores of a core cluster of the processor-based device are active among the plurality of processor cores, wherein the core cluster comprises a PLL; the plurality of processor cores are based on a common ISA; each processor core of the plurality of processor cores is configured to operate synchronously based on a same clock signal from the PLL; the plurality of processor cores comprises the first subset of processor cores and a second subset of processor cores; each processor core of the first subset of processor cores is implemented with a different physical characteristic relative to the second subset of processor cores; and the different physical characteristic enables a higher operating frequency of each processor core of the first subset of processor cores than that of each processor core of the second subset of processor cores. The method further comprises, responsive to determining that only the one or more processor cores of the first subset are active among the plurality of processor cores, switching, by a DVFS circuit of the core cluster, the core cluster from a first DVFS state to a second DVFS state higher than the first DVFS state.

In another aspect, a non-transitory computer-readable medium is disclosed. The non-transitory computer-readable medium stores computer-executable instructions that, when executed, cause a processor device of a processor-based device to determine that only one or more processor cores of a first subset of processor cores of a plurality of processor cores of a core cluster of the processor-based device are active among the plurality of processor cores, wherein the core cluster comprises a PLL; the plurality of processor cores are based on a common ISA; each processor core of the plurality of processor cores is configured to operate synchronously based on a same clock signal from the PLL; the plurality of processor cores comprises the first subset of processor cores and a second subset of processor cores; each processor core of the first subset of processor cores is implemented with a different physical characteristic relative to the second subset of processor cores; and the different physical characteristic enables a higher operating frequency of each processor core of the first subset of processor cores than that of each processor core of the second subset of processor cores. The computer-executable instructions further cause the processor-based device to, responsive to determining that only the one or more processor cores of the first subset are active among the plurality of processor cores, switch the core cluster from a first DVFS state to a second DVFS state higher than the first DVFS state.

DETAILED DESCRIPTION

Figure 1:
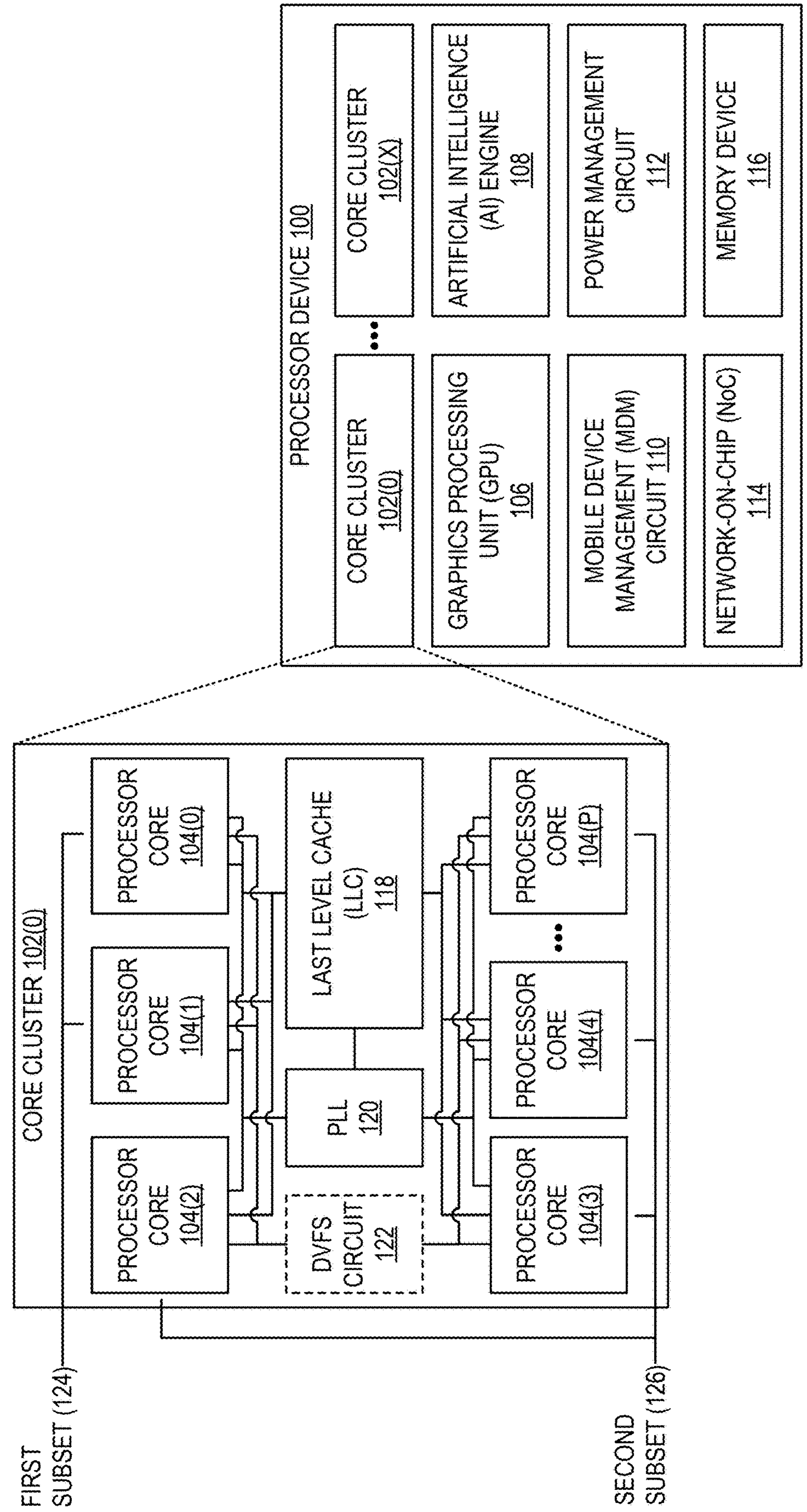
FIG. 1 is a block diagram of an exemplary processor-based device that includes a core cluster configured to implement asymmetric processor cores to enable higher operating frequencies, according to some aspects.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects. The terms "first," "second," and the like are used herein to distinguish between similarly named elements, and are not to be interpreted as indicating an ordinal relationship between such elements unless expressly described as such herein.

Aspects disclosed in the detailed description include implementing asymmetric processor cores to enable higher operating frequencies in processor-based devices. Related apparatus, methods, and computer-readable media are also disclosed. In this regard, a processor-based device provides a plurality of core clusters that each comprise a plurality of processor cores and a corresponding phase-locked loop (PLL). Each processor core is based on a common instruction set architecture (ISA) and is configured to operate synchronously based on a same clock signal from the PLL of the corresponding core cluster. A first subset of processor cores within each core cluster is implemented with a different physical characteristic relative to a second subset of processor cores within the core cluster, wherein the different physical characteristic enables each processor core of the first subset of processor cores to operate at a higher operating frequency than each processor core of the second subset of processor cores. Because the first subset of processor cores physically differs from the second subset of processor cores, the processor cores of each core cluster are said to be "asymmetric." The use of asymmetric processor cores enables the processor-based device to maximize processor performance when only processor cores within the first subset are active, while also improving energy efficiency when processor cores within the second subset are also active.

In some aspects, the different physical characteristic of the first subset of processor cores comprises a clock path between each of the first subset of processor cores and the PLL that is faster than a clock path between each of the second subset of processor cores and the PLL. This may be implemented in some such aspects by, e.g., physically locating the PLL closer to the first subset of processor cores than the second subset of processor cores. Some aspects may provide that each processor core of first subset of processor cores is implemented with the different physical characteristic by being optimized to operate at a first minimum voltage/frequency operating point and a first maximum voltage/frequency operating point that are higher than a second minimum voltage/frequency operating point and a second maximum voltage/frequency operating point, respectively, of the second subset of processor cores. In such aspects, the first maximum voltage/frequency operating point may correspond to a peak single-thread frequency, while the second maximum voltage/frequency operating point corresponds to a peak multi-thread frequency that is lower than the peak single-thread frequency.

According to some aspects, the different physical characteristic of the first subset of processor cores comprises a first plurality of library cells optimized for higher frequency, while each processor core of the second subset of processor cores is implemented using a second plurality of library cells optimized for energy efficiency. In some aspects, the different physical characteristic of the first subset of processor cores comprises a plurality of block head switches (BHS), while the second plurality of library cells is implemented using a plurality of globally distributed head switches (GDHS).

In exemplary operation, the processor-based device is configured to determine (e.g., using a dynamic voltage and frequency scaling (DVFS) circuit) of the core cluster) that only one or more of the processor cores of the first subset are active among the plurality of processor cores. In response to determining that only the one or more processor cores of the first subset are active among the plurality of processor cores, the DVFS circuit of the core cluster switches the core cluster from a first DVFS state to a second DVFS state higher than the first DVFS state. In some aspects, the DVFS circuit may subsequently determine that one or more of the processor cores of the second subset of processor cores has become active. In response, the DVFS circuit in such aspects switches the core cluster to a third DVFS state lower than the second DVFS state.

In this regard, FIG. 1 is a block diagram of an exemplary processor-based device 100 (also referred to a "processor" or a "CPU"). The processor-based device 100 may comprise an in-order or an out-of-order processor (OoP), and/or may be one of a plurality of processor-based devices 100. Examples of the processor-based device 100 may include, but are not limited to, a digital signal processor (DSP), general-purpose microprocessor, application specific integrated circuit (ASIC), field programmable logic array (FPGA), or other equivalent integrated or discrete logic circuitry.

As seen in FIG. 1, the processor-based device 100 comprises a plurality of core clusters 102(0)-102(X), each of which comprises a plurality of processor cores such as the processor cores 104(0)-104(P) of the core cluster 102(0). The processor-based device 100 in the example of FIG. 1 also comprises a graphics processing unit (GPU) 106 for performing graphical operations. As a non-limiting example, the GPU 106 may comprise a dedicated hardware unit having fixed functionality and programmable components for rendering graphics and executing GPU applications. The GPU 106 may also include a DSP, general-purpose microprocessor, ASIC, FPGA, or other equivalent integrated or discrete logic circuitry, which are not shown in FIG. 1 for the sake of clarity.

The processor-based device 100 in the example of FIG. 1 further comprises additional exemplary elements, including an artificial intelligence (AI) engine 108, a mobile device management (MDM) circuit 110, a power management circuit 112, a network-on-chip (NoC) 114, and a memory device 116. The AI engine 108 of the processor-based device 100 comprises circuitry and logic for providing AI-based functionality such as search, speech recognition, text and/or image generation, and the like, as non-limiting examples. The MDM circuit 110 provides functionality for provisioning, configuring, updating, and/or securing a mobile device into which the processor-based device 100 is integrated. The power management circuit 112 provides high-level performance and power management functionality for the processor-based device 100 as a whole, while the NoC 114 is configured to manage communications between the different devices that comprise the processor-based device 100. Finally, the memory device 116 provides storage of and access to data used by the processor-based device 100, and, in some aspects, may comprise a Double Data Rate (DDR)

Synchronous Dynamic Random-Access Memory (SDRAM) device, as a non-limiting example.

The processor-based device 100 of FIG. 1 may encompass any one of known digital logic elements, semiconductor circuits, processing cores, and/or memory structures, among other elements, or combinations thereof. Aspects described herein are not restricted to any particular arrangement of elements, and the disclosed techniques may be easily extended to various structures and layouts on semiconductor dies or packages. It is to be understood that some aspects of the processor-based device 100 and/or the processor cores 104(0)-104(P) may include elements in addition to those illustrated in FIG. 1, and/or may include more or fewer of the elements illustrated in FIG. 1. For example, the processor-based device 100 may further include caches, controllers, communications buses, and/or persistent storage devices, which are omitted from FIG. 1 for the sake of clarity.

FIG. 1 further illustrates exemplary elements of the core cluster 102(0) in greater detail. The processor cores 104(0)-104(P) of the core cluster 102(0) are communicatively coupled to a last-level cache (LLC) 118 that stores frequently-accessed data for quicker access, and to a PLL 120 that provides a clock signal to the processor cores 104(0)-104(P) and the LLC 118. The frequency and voltage at which the processor cores 104(0)-104(P) of the core cluster 102(0) operate is controlled in some aspects by a DVFS circuit 122. The DVFS circuit 122 is configured to place the core cluster 102(0) into one of multiple DVFS states that each correspond to a voltage and a clock frequency (i.e., a voltage/frequency operating point) at which the processor cores 104(0)-104(P) of the core cluster 102(0) operate. For example, a highest DVFS state may correspond to a highest voltage/frequency operating point for the core cluster 102(0) to enable a highest level of processor performance, while a lower DVFS state may correspond to a voltage/frequency operating point lower than that of the highest DVFS state to enable greater energy efficiency. It is to be understood that, while FIG. 1 only shows exemplary elements of the core cluster 102(0), each of the core clusters 102(0)-102(X) include elements corresponding to the illustrated elements of the core cluster 102(0). Because the processor cores 104(0)-104(P) and the LLC 118 all operate using a same clock signal generated by the PLL 120, the core cluster 102(0) and the processor cores 104(0)-104(P) thereof are considered "synchronous."

As noted above, in conventional processor-based devices, synchronous processor cores such as the processor cores 104(0)-104(P) may be physically implemented using individual blocks that are each built separately and then connected or "stitched" together on-die. This results in the integral elements of the processor cores and the connections therebetween being physically identical (with the physical layout of the integral elements either being identical among the processor cores, or being mirrored or rotated). While this approach results in quicker design turnaround, such processor cores may not be able to provide both higher peak performance and improved energy efficiency.

In this regard, the core cluster 102(0) provides a first subset 124 of processor cores 104(0)-104(1) that are each implemented with a different physical characteristic relative to a second subset 126 of processor cores 104(2)-104(P), wherein the different physical characteristic enables a higher operating frequency to be achieved by each processor core of the first subset 124 of processor cores 104(0)-104(1) than that of each processor core of the second subset 126 of processor cores 104(2)-104(P). It is to be understood that, while the first subset 124 illustrated in FIG. 1 includes two (2) processor cores, in some aspects the first subset 124 may comprise more or fewer processor cores.

In some aspects described below in greater detail with respect to FIG. 2, the different physical characteristic of the first subset 124 of processor cores 104(0)-104(1) comprises a clock path between each of the processor cores 104(0)-104(1) and the PLL 120 that is faster than a clock path between each of the processor cores 104(2)-104(P) and the PLL 120. Aspects such as those described below with respect to FIG. 3 may provide that each processor core of first subset 124 of processor cores 104(0)-104(1) is implemented with the different physical characteristic by being optimized to operate at a first minimum voltage/frequency operating point and a first maximum voltage/frequency operating point that are higher than a second minimum voltage/frequency operating point and a second maximum voltage/frequency operating point, respectively, of the second subset 126 of processor cores 104(2)-104(P). According to some aspects described below with respect to FIG. 4, the different physical characteristic of the first subset 124 of processor cores 104(0)-104(1) comprises a first plurality of library cells optimized for higher frequency, while each processor core of the second subset 126 of processor cores 104(2)-104(P) is implemented using a second plurality of library cells optimized for energy efficiency. In some aspects described below with respect to FIG. 5, the first subset 124 of processor cores 104(0)-104(1) is implemented with the different physical characteristic by being implemented to provide a power grid using a plurality of BHSes, while the second subset 126 of processor cores 104(2)-104(P) is implemented using a plurality of GDHSes.

By implementing the processor cores 104(0)-104(P) asymmetrically, the core cluster 102(0) is able to achieve a higher peak operating frequency when only the processor cores 104(0)-104(1) of the first subset 124 are active, and can also achieve increased energy efficiency when the processor cores 104(2)-104(P) of the second subset 126 are also active. For example, in exemplary operation, the processor-based device 100 is configured to determine (e.g., using the DVFS circuit 122) that only one or more of the processor cores 104(0)-104(1) of the first subset 124 are active among the plurality of processor cores 104(0)-104(P). The DVFS circuit 122 of the core cluster 102(0), in response to determining that only the one or more processor cores 104(0)-104(1) of the first subset 124 are active among the plurality of processor cores 104(0)-104(P), switches the core cluster 102(0) from a first DVFS state to a second DVFS state higher than the first DVFS state. The DVFS circuit 122 may subsequently determine that one or more of the processor cores 104(2)-104(P) of the second subset 126 has become active, and, in response, may switch the core cluster 102(0) to a third DVFS state lower than the second DVFS state.

Figure 2:
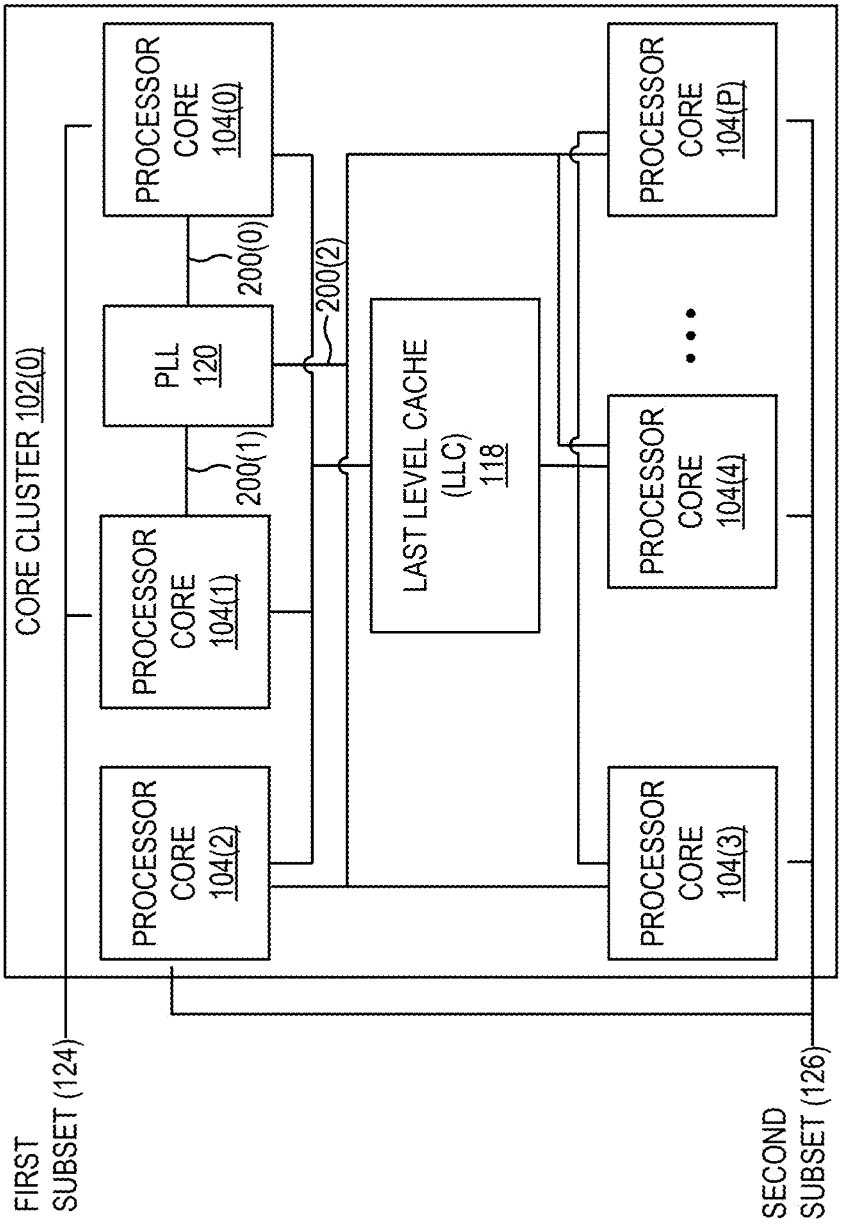
FIG. 2 is a block diagram illustrating an exemplary aspect of the core cluster of FIG. 1 in which a first subset of processor cores is implemented to provide a clock path that is faster than a clock path for a second subset of processor cores, according to some aspects.

FIG. 2 illustrates one example of the different physical characteristic with which the first subset 124 of processor cores 104(0)-104(1) of the core cluster 102(0) of FIG. 1 may be implemented. In the example of FIG. 2, the first subset 124 of processor cores 104(0)-104(1) is implemented with clock paths 200(0) and 200(1) between the each of the processor cores 104(0)-104(1), respectively, and the PLL 120 of the core cluster 102(0). The clock paths 200(0) and 200(1) are faster than, e.g., a clock path 200(2) between each of the processor cores 104(2)-104(P) and the PLL 120. In some aspects, the clock paths 200(0) and 200(1) are implemented by physically locating the PLL 120 closer to the first subset 124 of processor cores 104(0)-104(1) than the second subset 126 of processor cores 104(2)-104(P), as seen in FIG.

2. The clock paths 200(0) and 200(1) and the physical location of the PLL 120 closer to the first subset 124 of processor cores 104(0)-104(1) reduces clock skew, and enables the processor cores 104(0)-104(1) to be run at a higher operating frequency when only one or more of the processor cores 104(0)-104(1) are active among the plurality of processor cores 104(0)-104(P).

Figure 3:
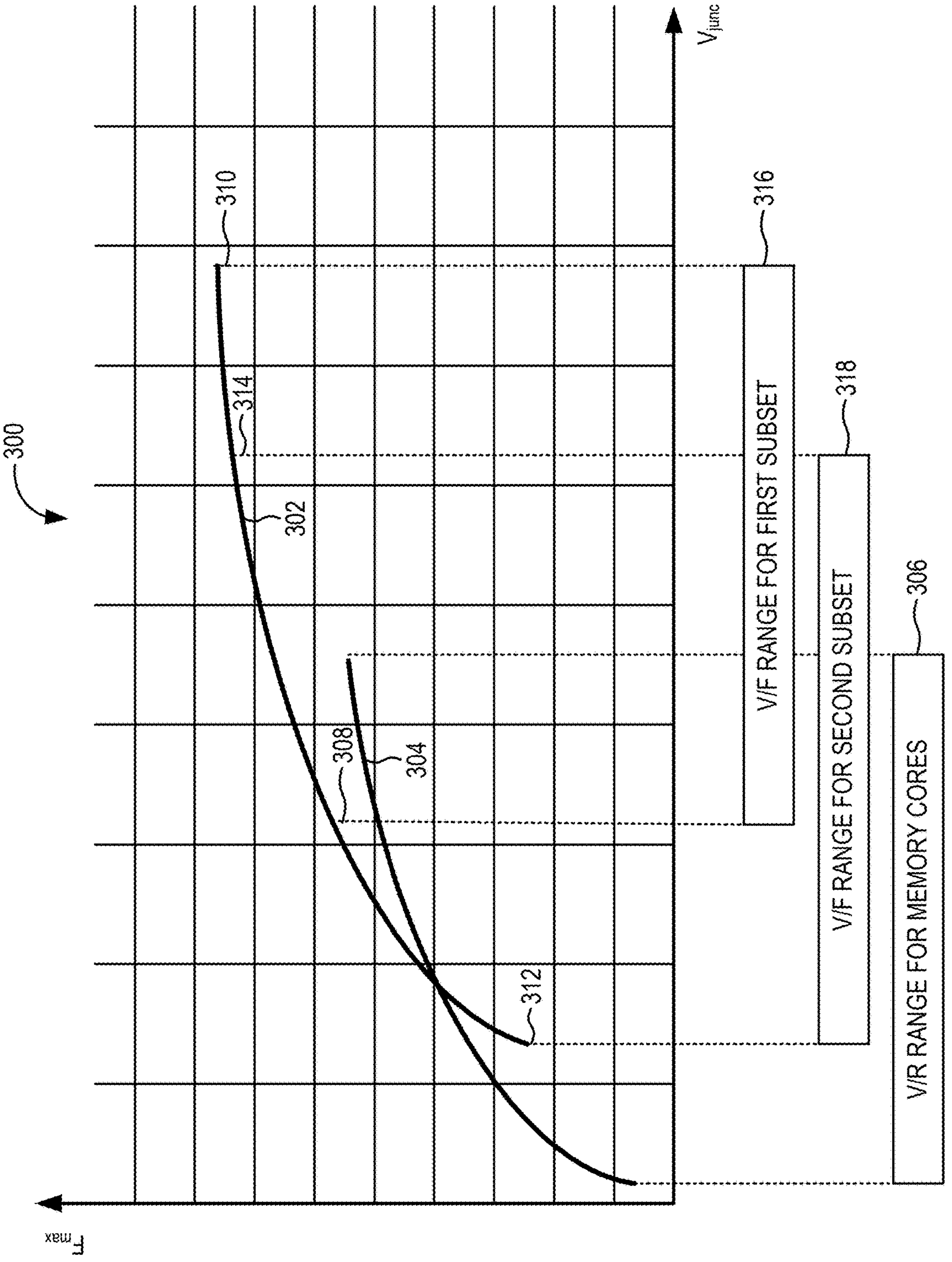
FIG. 3 is a block diagram illustrating exemplary voltage/frequency (V/F) ranges provided by different subsets of processor cores of an exemplary aspect of the core cluster of FIG. 1, according to some aspects.

In another example, the different physical characteristic of the first subset 124 of processor cores 104(0)-104(1) of the core cluster 102(0) of FIG. 1 comprises optimizations to the processor cores 104(0)-104(1) to enable them to operate at higher voltage/frequency (V/F) ranges than the second subset 126 of processor cores 104(2)-104(P). In this regard, FIG. 3 provides a chart 300 that illustrates two V/F curves 302 and 304. The V/F curve 302 corresponds to a potential V/F range for processor cores such as the processor cores 104(0)-104(P), while the V/F curve 304 corresponds to a V/F range 306 for memory cores of the processor-based device 100 (not shown in FIG. 3).

The first subset 124 of processor cores 104(0)-104(1) of the core cluster 102(0) of FIG. 1 are optimized to operate at a first minimum voltage/frequency operating point 308 and a first maximum voltage/frequency operating point 310 that are higher than a second minimum voltage/frequency operating point 312 and a second maximum voltage/frequency operating point 314, respectively, of the second subset 126 of processor cores 104(2)-104(P). The first minimum voltage/frequency operating point 308 and the first maximum voltage/frequency operating point 310 define a V/F range 316 for the first subset 124, while the second minimum voltage/frequency operating point 312 and the second maximum voltage/frequency operating point 314 define a V/F range 318 for the second subset 126. The first maximum voltage/frequency operating point 310 may correspond to a peak single-thread frequency, and the second maximum voltage/frequency operating point 314 may correspond to a peak multi-thread frequency that is lower than the peak single-thread frequency.

Figure 4:
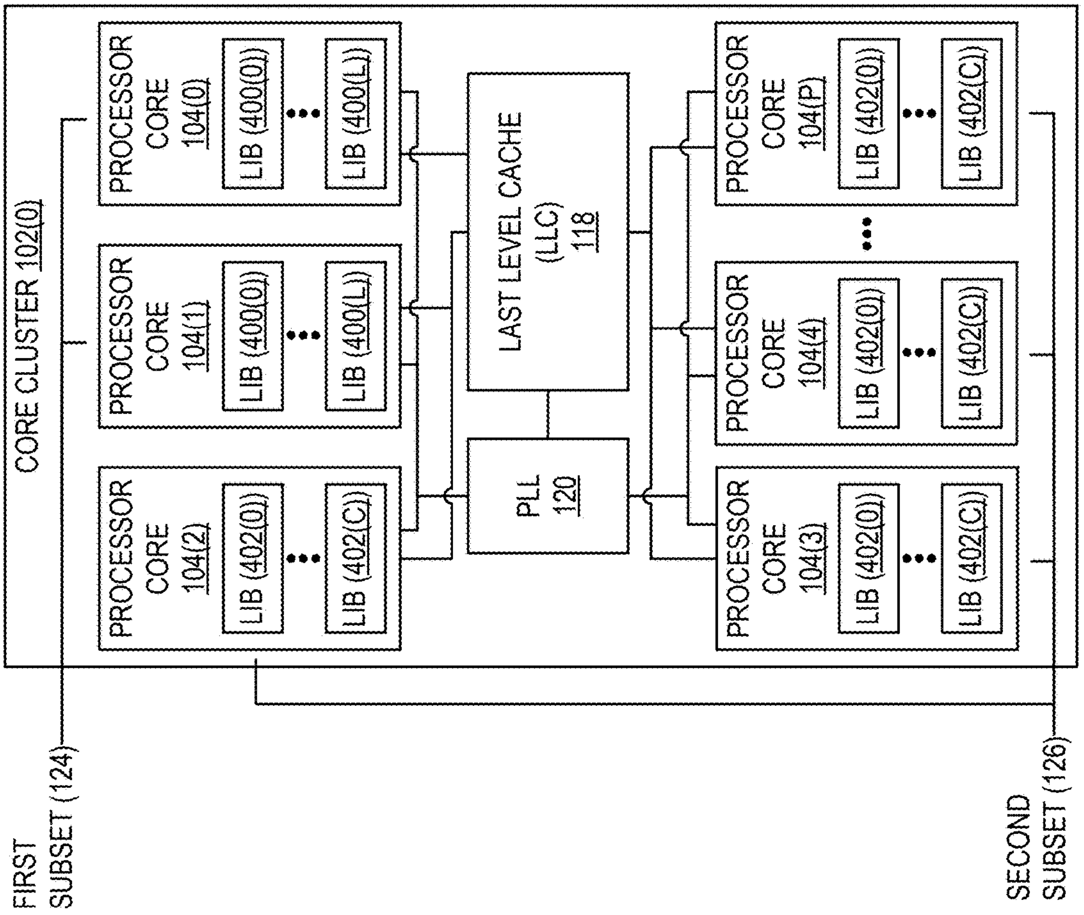
FIG. 4 is a block diagram illustrating an exemplary aspect of the core cluster of FIG. 1 in which a subset of processor cores is implemented using library cells optimized for higher frequency, according to some aspects.

FIG. 4 illustrates yet another example of the different physical characteristic with which the first subset 124 of processor cores 104(0)-104(1) of the core cluster 102(0) of FIG. 1 may be implemented. In FIG. 4, the processor cores 104(0)-104(1) of the first subset 124 are implemented using a first plurality of library cells (captioned as "LIB" in FIG. 4) 400(0)-400(L) that are each optimized for higher frequency, while the processor cores 104(2)-104(P) of the second subset 126 are implemented using a second plurality of library cells (captioned as "LIB" in FIG. 4) 402(0)-402(C) that are optimized for energy efficiency. For example, the library cells 400(0)-400(L) may operate at higher frequencies, but may be larger and "leakier" (i.e., may consume more energy when not active), than the library cells 402(0)-402(C).

Figure 5:
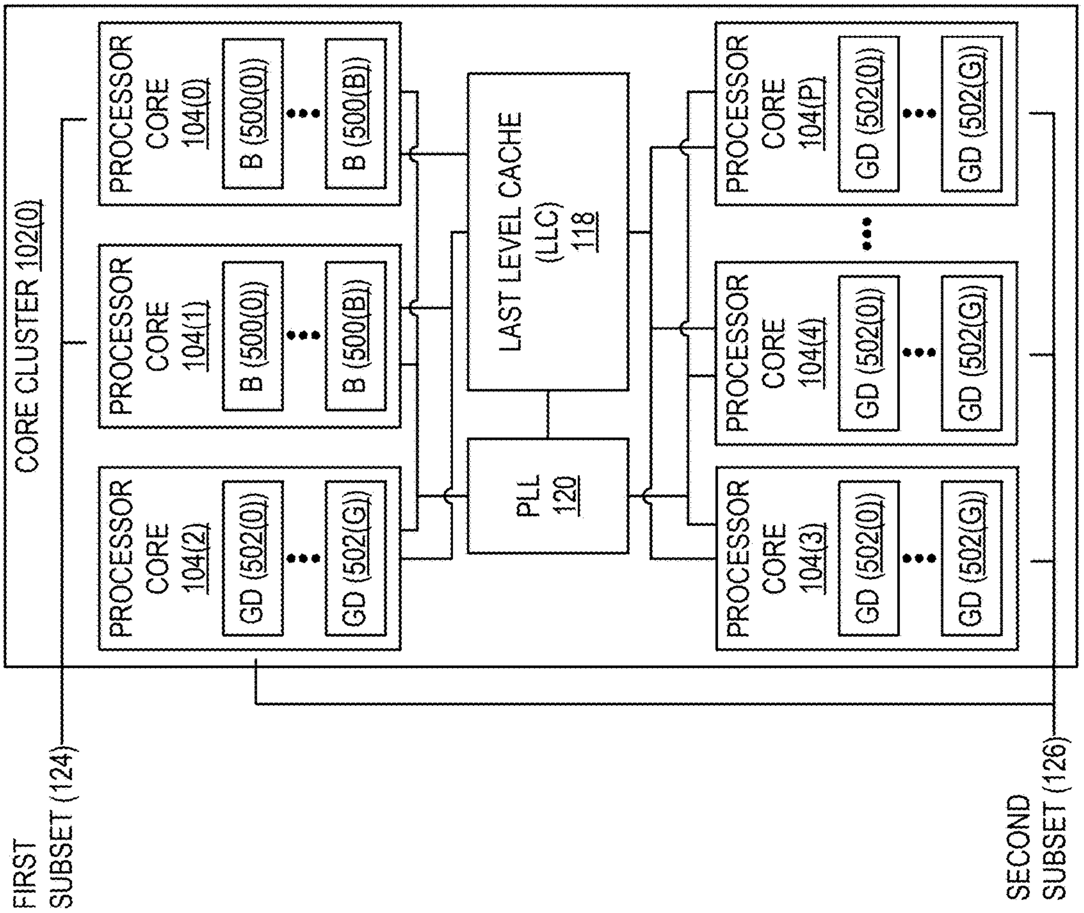
FIG. 5 is a block diagram illustrating an exemplary aspect of the core cluster of FIG. 1 in which a subset of processor cores is implemented using block head switches (BHS) instead of globally distributed head switches (GDHS), according to some aspects.

FIG. 5 illustrates still another example of the different physical characteristic with which the first subset 124 of processor cores 104(0)-104(1) of the core cluster 102(0) of FIG. 1 may be implemented. In the example of FIG. 5, the different physical characteristic of the processor cores 104(0)-104(1) relates to the implementation of power switches used to provide power grids for the processor cores 104(0)-104(1). In particular, the processor cores 104(0)-104(1) of the first subset 124 are implemented using a plurality of BHSes (captioned as "B" in FIG. 5) 500(0)-500(B), while the processor cores 104(2)-104(P) of the second subset 126 are implemented using a plurality of more energy-efficient GDHSes (captioned as "GD" in FIG. 5) 502(0)-502(G).

Figure 6:
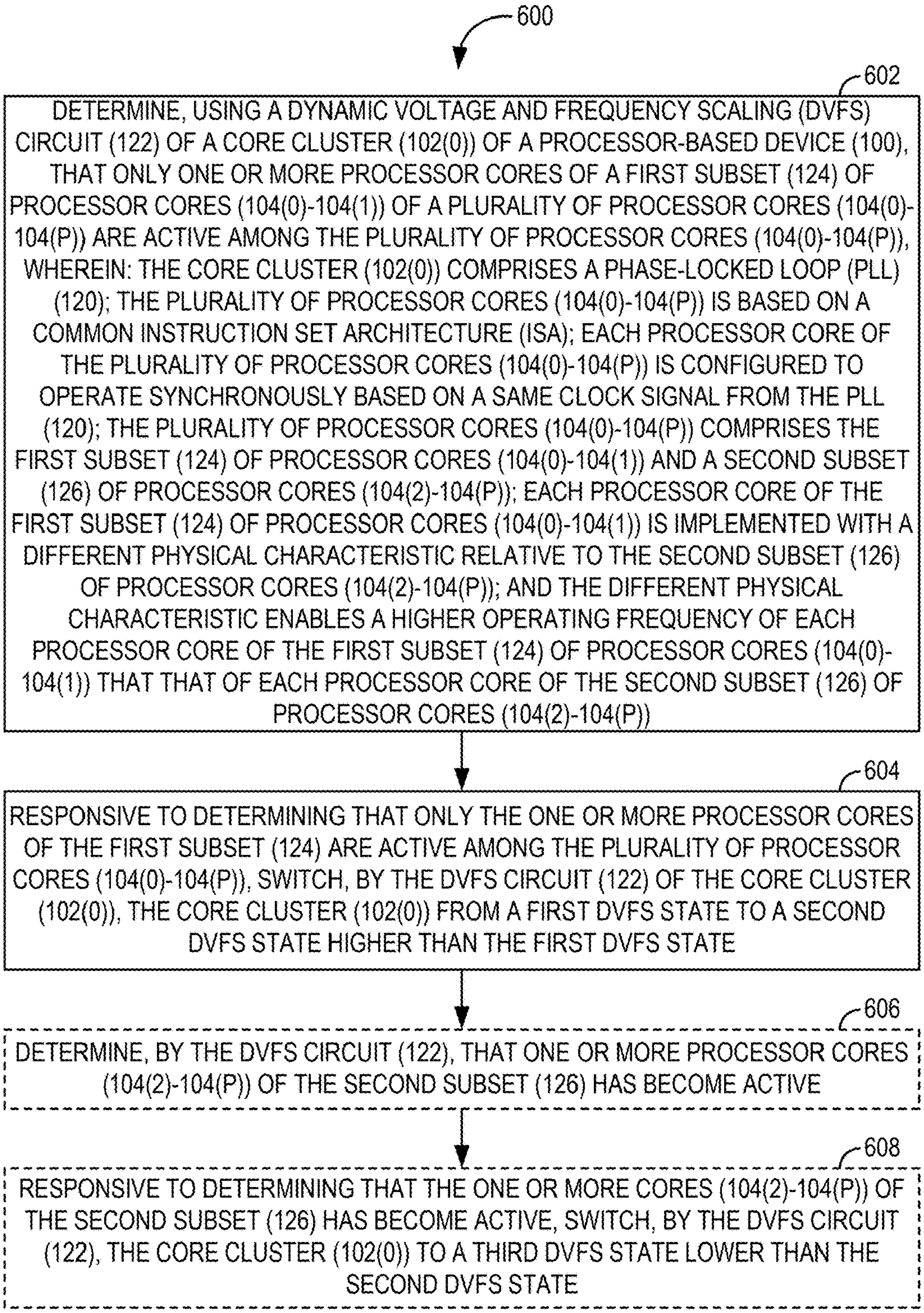
FIG. 6 provides a flowchart illustrating exemplary operations performed by the processor-based device of FIG. 1 for implementing asymmetric processor cores to enable higher operating frequencies, according to some aspects.

To illustrate exemplary operations performed by the processor-based device 100 of FIG. 1 for implementing asymmetric processor cores according to some aspects, FIG. 6 provides a flowchart illustrating exemplary operations 600. For the sake of clarity, elements of FIG. 1 are referenced in describing FIG. 6. It is to be understood that, in some aspects, some of the exemplary operations 600 may be performed in an order other than that illustrated herein, and/or may be omitted.

The exemplary operations 600 begin with a processor-based device (e.g., using a DVFS circuit such as the DVFS circuit 122 of the core cluster 102(0) of the processor-based device 100 of FIG. 1) determining that only one or more processor cores of a first subset of processor cores (such as the subset 124 of processor cores 104(0)-104(1) of FIG. 1) of a plurality of processor cores (e.g., the processor cores 104(0)-104(P) of FIG. 1) are active among the plurality of processor cores 104(0)-104(P) (block 602). The core cluster 102(0) used in the operations of block 602 comprises a PLL (e.g., the PLL 120 of FIG. 1), and the plurality of processor cores 104(0)-104(P) is based on a common ISA. Each processor core of the plurality of processor cores 104(0)-104(P) is configured to operate synchronously based on a same clock signal from the PLL 120. The plurality of processor cores 104(0)-104(P) comprises the first subset 124 of processor cores 104(0)-104(1) and a second subset of processor cores (such as the second subset 126 of processor cores 104(2)-104(P) of FIG. 1). Each processor core of the first subset 124 of processor cores 104(0)-104(1) is implemented with a different physical characteristic relative to the second subset 126 of processor cores 104(2)-104(P), and the different physical characteristic enables a higher operating frequency of each processor core of the first subset 124 of processor cores 104(0)-104(1) that that of each processor core of the second subset 126 of processor cores 104(2)-104(P).

In response to determining that only the one or more processor cores of the first subset 124 are active among the plurality of processor cores 104(0)-104(P), the DVFS circuit 122 switches the core cluster 102(0) from a first DVFS state to a second DVFS state that is higher than the first DVFS state (block 604). In some aspects, the DVFS circuit 122 may subsequently determine that one or more processor cores 104(2)-104(P) of the second subset 126 has become active (block 606). In response, the DVFS circuit 122 in such aspects switches the core cluster 102(0) to a third DVFS state lower than the second DVFS state (block 608).

The processor-based device according to aspects disclosed herein and discussed with reference to FIGS. 1-5 may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, laptop computer, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, an avionics system, a drone, and a multicopter.

Figure 7:
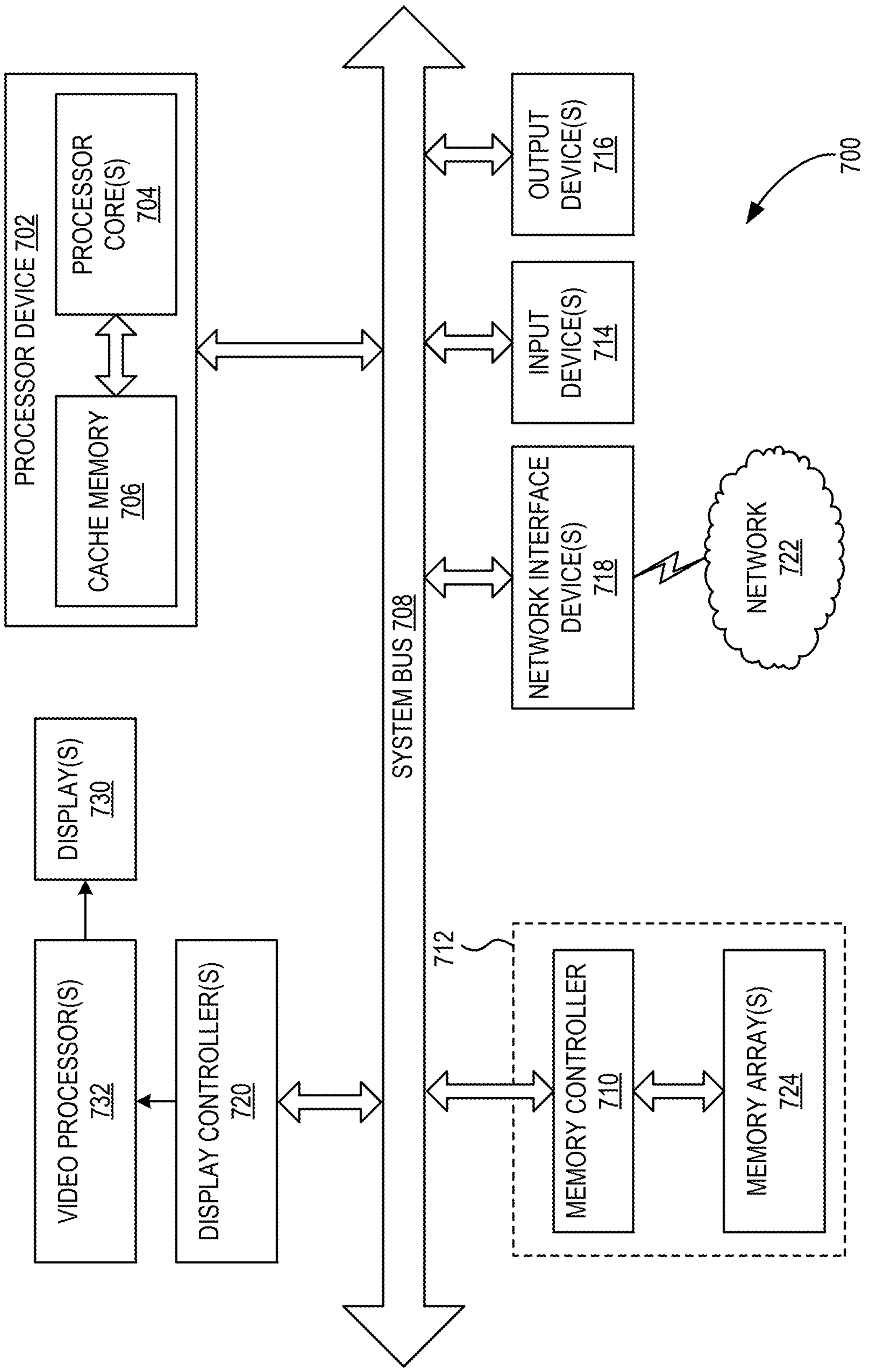
FIG. 7 is a block diagram of an exemplary processor-based device that can include the processor-based device of FIG. 1.

In this regard, FIG. 7 illustrates an example of a processor-based device 700 as illustrated and described with respect to FIG. 1. In this example, the processor-based device 700 includes a processor device 702, which corresponds in functionality to the processor-based device 100 of FIG. 1 and comprises one or more processor cores 704 coupled to a cache memory 706. The processor core(s) 704 is also coupled to a system bus 708 and can intercouple devices included in the processor-based device 700. As is well known, the processor core(s) 704 communicates with these other devices by exchanging address, control, and data information over the system bus 708. For example, the processor core(s) 704 can communicate bus transaction requests to a memory controller 710. Although not illustrated in FIG. 7, multiple system buses 708 could be provided, wherein each system bus 708 constitutes a different fabric.

Other devices may be connected to the system bus 708. As illustrated in FIG. 7, these devices can include a memory system 712, one or more input devices 714, one or more output devices 716, one or more network interface devices 718, and one or more display controllers 720, as examples. The input device(s) 714 can include any type of input device, including, but not limited to, input keys, switches, voice processors, etc. The output device(s) 716 can include any type of output device, including, but not limited to, audio, video, other visual indicators, etc. The network interface device(s) 718 can be any devices configured to allow exchange of data to and from a network 722. The network 722 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 718 can be configured to support any type of communications protocol desired. The memory system 712 can include the memory controller 710 coupled to one or more memory arrays 724. The display controller(s) 720 may comprise, e.g., the GPU 106 of FIG. 1.

The processor core(s) 704 may also be configured to access the display controller(s) 720 over the system bus 708 to control information sent to one or more displays 730. The display controller(s) 720 sends information to the display(s) 730 to be displayed via one or more video processors 732, which process the information to be displayed into a format suitable for the display(s) 730. The display(s) 730 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered clauses:

1. A processor-based device, comprising:
   a core cluster comprising:
   a phase-locked loop (PLL); and
   a plurality of processor cores based on a common instruction set architecture (ISA), wherein:
   each processor core of the plurality of processor cores is configured to operate synchronously based on a same clock signal from the PLL;
   the plurality of processor cores comprises a first subset of processor cores and a second subset of processor cores;
   each processor core of the first subset of processor cores is implemented with a different physical characteristic relative to the second subset of processor cores; and
   the different physical characteristic enables a higher operating frequency of each processor core of the first subset of processor cores than that of each processor core of the second subset of processor cores.
2. The processor-based device of clause 1, wherein the core cluster further comprises a dynamic voltage and frequency scaling (DVFS) circuit configured to:
   determine that only one or more processor cores of the first subset are active among the plurality of processor cores; and
   responsive to determining that only the one or more processor cores of the first subset are active among the plurality of processor cores, switch the core cluster from a first DVFS state to a second DVFS state higher than the first DVFS state.
3. The processor-based device of clause 2, wherein the DVFS circuit is further configured to:
   determine that one or more processor cores of the second subset of processor cores has become active; and
   responsive to determining that the one or more processor cores of the second subset of processor cores has become active, switch the core cluster to a third DVFS state lower than the second DVFS state.
4. The processor-based device of any one of clauses 1-3, wherein each processor core of the first subset of processor cores is implemented with the different physical characteristic by being implemented to provide a first clock path between the processor core and the PLL that is faster than a second clock path between each processor core of the second subset of processor cores and the PLL.
5. The processor-based device of clause 4, wherein the PLL is physically located closer to the first subset of processor cores than the second subset of processor cores.
6. The processor-based device of any one of clauses 1-3, wherein:
   each processor core of the first subset of processor cores is implemented with the different physical characteristic by being optimized to operate at a first minimum voltage/frequency operating point and a first maximum voltage/frequency operating point; and
   the first minimum voltage/frequency operating point and the first maximum voltage/frequency operating point are higher than a second minimum voltage/frequency operating point and a second maximum voltage/frequency operating point, respectively, of the second subset.
7. The processor-based device of clause 6, wherein:
   the first maximum voltage/frequency operating point corresponds to a peak single-thread frequency; and
   the second maximum voltage/frequency operating point corresponds to a peak multi-thread frequency that is lower than the peak single-thread frequency.
8. The processor-based device of any one of clauses 1-3, wherein:
   each processor core of the first subset of processor cores is implemented with the different physical characteristic by being implemented using a first plurality of library cells optimized for higher frequency; and
   each processor core of the second subset of processor cores is implemented using a second plurality of library cells optimized for energy efficiency.
9. The processor-based device of any one of clauses 1-3, wherein:
   each processor core of the first subset of processor cores is implemented with the different physical characteristic by being implemented using a plurality of block head switches (BHS); and
   each processor core of the second subset of processor cores is implemented using a plurality of globally distributed head switches (GDHS).
10. The processor-based device of any one of clauses 1-9, integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.
11. A processor-based device, comprising:
   means for determining that only one or more processor cores of a first subset of processor cores of a plurality of processor cores of a core cluster of a processor-based device are active among the plurality of processor cores, wherein:
   the core cluster comprises a phase-locked loop (PLL);
   the plurality of processor cores are based on a common instruction set architecture (ISA);
   each processor core of the plurality of processor cores is configured to operate synchronously based on a same clock signal from the PLL;
   the plurality of processor cores comprises the first subset of processor cores and a second subset of processor cores;
   each processor core of the first subset of processor cores is implemented with a different physical characteristic relative to the second subset of processor cores; and
   the different physical characteristic enables a higher operating frequency of each processor core of the first subset of processor cores than that of each processor core of the second subset of processor cores; and means for switching the core cluster from a first dynamic voltage and frequency scaling (DVFS) state to a second DVFS state higher than the first DVFS state, responsive to determining that only the one or more processor cores of the first subset are active among the plurality of processor cores.

12. A method for implementing asymmetric processor cores in processor-based devices, comprising:

determining, by a processor-based device, that only one or more processor cores of a first subset of processor cores of a plurality of processor cores of a core cluster of the processor-based device are active among the plurality of processor cores, wherein:

the core cluster comprises a phase-locked loop (PLL);

the plurality of processor cores are based on a common instruction set architecture (ISA);

each processor core of the plurality of processor cores is configured to operate synchronously based on a same clock signal from the PLL;

the plurality of processor cores comprises the first subset of processor cores and a second subset of processor cores;

each processor core of the first subset of processor cores is implemented with a different physical characteristic relative to the second subset of processor cores; and the different physical characteristic enables a higher operating frequency of each processor core of the first subset of processor cores that that of each processor core of the second subset of processor cores; and responsive to determining that only the one or more processor cores of the first subset are active among the plurality of processor cores, switching, by a dynamic voltage and frequency scaling (DVFS) circuit of the core cluster, the core cluster from a first DVFS state to a second DVFS state higher than the first DVFS state.

13. The method of clause 12, further comprising:

determining, by the DVFS circuit, that one or more processor cores of the second subset of processor cores has become active; and responsive to determining that the one or more processor cores of the second subset of processor cores has become active, switching, by the DVFS circuit, the core cluster to a third DVFS state lower than the second DVFS state.

14. The method of any one of clauses 12-13, wherein each processor core of the first subset of processor cores is implemented with the different physical characteristic by being implemented to provide a first clock path between the processor core and the PLL that is faster than a second clock path between each processor core of the second subset of processor cores and the PLL.

15. The method of clause 14, wherein the PLL is physically located closer to the first subset of processor cores than the second subset of processor cores.

16. The method of any one of clauses 12-13, wherein:

each processor core of the first subset of processor cores is implemented with the different physical characteristic by being optimized to operate at a first minimum voltage/frequency operating point and a first maximum voltage/frequency operating point; and the first minimum voltage/frequency operating point and the first maximum voltage/frequency operating point are higher than a second minimum voltage/frequency operating point and a second maximum voltage/frequency operating point, respectively, of the second subset.

17. The method of clause 16, wherein:

the first maximum voltage/frequency operating point corresponds to a peak single-thread frequency; and the second maximum voltage/frequency operating point corresponds to a peak multi-thread frequency that is lower than the peak single-thread frequency.

18. The method of any one of clauses 12-13, wherein:

each processor core of the first subset of processor cores is implemented with the different physical characteristic by being implemented using a first plurality of library cells optimized for higher frequency; and each processor core of the second subset of processor cores is implemented using a second plurality of library cells optimized for energy efficiency.

19. The method of any one of clauses 12-13, wherein:

each processor core of the first subset of processor cores is implemented with the different physical characteristic by being implemented using a plurality of block head switches (BHS); and each processor core of the second subset of processor cores is implemented using a plurality of globally distributed head switches (GDHS).

20. A non-transitory computer-readable medium, having stored thereon computer-executable instructions that, when executed, cause a processor device of a processor-based device to:

determine that only one or more processor cores of a first subset of processor cores of a plurality of processor cores of a core cluster of the processor-based device are active among the plurality of processor cores, wherein:

the core cluster comprises a phase-locked loop (PLL);

the plurality of processor cores are based on a common instruction set architecture (ISA);

each processor core of the plurality of processor cores is configured to operate synchronously based on a same clock signal from the PLL;

the plurality of processor cores comprises the first subset of processor cores and a second subset of processor cores;

each processor core of the first subset of processor cores is implemented with a different physical characteristic relative to the second subset of processor cores; and the different physical characteristic enables a higher operating frequency of each processor core of the first subset of processor cores that that of each processor core of the second subset of processor cores; and responsive to determining that only the one or more processor cores of the first subset are active among the plurality of processor cores, switch the core cluster from a first dynamic voltage and frequency scaling (DVFS) state to a second DVFS state higher than the first DVFS state.

21. The non-transitory computer-readable medium of clause 20, wherein the computer-executable instructions further cause the processor-based device to:
    determine that one or more processor cores of the second subset of processor cores has become active; and
    responsive to determining that the one or more processor cores of the second subset of processor cores has become active, switch the core cluster to a third DVFS state lower than the second DVFS state.
22. The non-transitory computer-readable medium of any one of clauses 20-21, wherein each processor core of the first subset of processor cores is implemented with the different physical characteristic by being implemented to provide a first clock path between the processor core and the PLL that is faster than a second clock path between each processor core of the second subset of processor cores and the PLL.
23. The non-transitory computer-readable medium of clause 22, wherein the PLL is physically located closer to the first subset of processor cores than the second subset of processor cores.
24. The non-transitory computer-readable medium of any one of clauses 20-21, wherein:
    each processor core of the first subset of processor cores is implemented with the different physical characteristic by being optimized to operate at a first minimum voltage/frequency operating point and a first maximum voltage/frequency operating point; and
    the first minimum voltage/frequency operating point and the first maximum voltage/frequency operating point are higher than a second minimum voltage/frequency operating point and a second maximum voltage/frequency operating point, respectively, of the second subset.
25. The non-transitory computer-readable medium of clause 24, wherein:
    the first maximum voltage/frequency operating point corresponds to a peak single-thread frequency; and
    the second maximum voltage/frequency operating point corresponds to a peak multi-thread frequency that is lower than the peak single-thread frequency.
26. The non-transitory computer-readable medium of any one of clauses 20-21, wherein:
    each processor core of the first subset of processor cores is implemented with the different physical characteristic by being implemented using a first plurality of library cells optimized for higher frequency; and
    each processor core of the second subset of processor cores is implemented using a second plurality of library cells optimized for energy efficiency.
27. The non-transitory computer-readable medium of any one of clauses 20-21, wherein:
    each processor core of the first subset of processor cores is implemented with the different physical characteristic by being implemented using a plurality of block head switches (BHS); and
    each processor core of the second subset of processor cores is implemented using a plurality of globally distributed head switches (GDHS).

What is claimed is:

1. A core cluster, comprising:
a phase-locked loop (PLL);
a dynamic voltage and frequency scaling (DVFS) circuit; and
a plurality of processor cores based on a common instruction set architecture (ISA), wherein:
each processor core of the plurality of processor cores is configured to operate synchronously based on a same clock signal from the PLL;
the plurality of processor cores comprises a first subset of processor cores and a second subset of processor cores;
each processor core of the first subset of processor cores is implemented with a different physical characteristic relative to the second subset of processor cores;
the different physical characteristic enables a higher operating frequency of each processor core of the first subset of processor cores than that of each processor core of the second subset of processor cores; and
the dynamic voltage and frequency scaling (DVFS) circuit is configured to:
determine that only one or more processor cores of the first subset of processor cores are active among the plurality of processor cores; and
responsive to determining that only the one or more processor cores of the first subset of processor cores are active among the plurality of processor cores, switch the core cluster from a first DVFS state to a second DVFS state higher than the first DVFS state.

2. The core cluster of claim 1, wherein the DVFS circuit is further configured to:
determine that one or more processor cores of the second subset of processor cores have become active; and
responsive to determining that the one or more processor cores of the second subset of processor cores have become active, switch the core cluster to a third DVFS state lower than the second DVFS state.

3. The core cluster of claim 1, wherein each processor core of the first subset of processor cores is implemented with the different physical characteristic by being implemented to provide a first clock path between the processor core and the PLL that is faster than a second clock path between each processor core of the second subset of processor cores and the PLL.

4. The core cluster of claim 3, wherein the PLL is physically located closer to the first subset of processor cores than the second subset of processor cores.

5. The core cluster of claim 1, wherein:
each processor core of the first subset of processor cores is implemented with the different physical characteristic by being optimized to operate at a first minimum voltage/frequency operating point and a first maximum voltage/frequency operating point; and
the first minimum voltage/frequency operating point and the first maximum voltage/frequency operating point are higher than a second minimum voltage/frequency operating point and a second maximum voltage/frequency operating point, respectively, of the second subset of processor cores.

6. The core cluster of claim 5, wherein:
the first maximum voltage/frequency operating point corresponds to a peak single-thread frequency; and
the second maximum voltage/frequency operating point corresponds to a peak multi-thread frequency that is lower than the peak single-thread frequency.

7. The core cluster of claim 1, wherein:
each processor core of the first subset of processor cores is implemented with the different physical characteristic by being implemented using a first plurality of library cells optimized for the higher operating frequency; and each processor core of the second subset of processor cores is implemented using a second plurality of library cells optimized for energy efficiency.

8. The core cluster of claim 1, wherein:

each processor core of the first subset of processor cores is implemented with the different physical characteristic by being implemented using a plurality of block head switches (BHS); and each processor core of the second subset of processor cores is implemented using a plurality of globally distributed head switches (GDHS).

9. The core cluster of claim 1, integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

10. A method for implementing asymmetric processor cores in processor-based devices, comprising:

determining, by a dynamic voltage and frequency scaling (DVFS) circuit of a core cluster while only one or more processor cores of a first subset of processor cores of a plurality of processor cores of the core cluster are active, that one or more processor cores of a second subset of processor cores of the plurality of processor cores have become active, wherein:

the core cluster comprises a phase-locked loop (PLL);

the plurality of processor cores are based on a common instruction set architecture (ISA);

each processor core of the plurality of processor cores is configured to operate synchronously based on a same clock signal from the PLL;

each processor core of the first subset of processor cores is implemented with a different physical characteristic relative to the second subset of processor cores; and the different physical characteristic enables a higher operating frequency of each processor core of the first subset of processor cores that that of each processor core of the second subset of processor cores; and responsive to determining that the one or more processor cores of the second subset of processor cores have become active, switching, by the DVFS circuit, the core cluster from a first DVFS state to a second DVFS state lower than the first DVFS state.

11. The method of claim 10, further comprising:

determining, by the DVFS circuit, that only the one or more processor cores of the first subset of processor cores are now active among the plurality of processor cores; and responsive to determining that only the one or more processor cores of the first subset of processor cores are now active, switching, by the DVFS circuit, the core cluster to a third DVFS state higher than the second DVFS state.

12. The method of claim 10, wherein each processor core of the first subset of processor cores is implemented with the different physical characteristic by being implemented to provide a first clock path between the processor core and the PLL that is faster than a second clock path between each processor core of the second subset of processor cores and the PLL.

13. The method of claim 12, wherein the PLL is physically located closer to the first subset of processor cores than the second subset of processor cores.

14. The method of claim 10, wherein:

each processor core of the first subset of processor cores is implemented with the different physical characteristic by being optimized to operate at a first minimum voltage/frequency operating point and a first maximum voltage/frequency operating point; and the first minimum voltage/frequency operating point and the first maximum voltage/frequency operating point are higher than a second minimum voltage/frequency operating point and a second maximum voltage/frequency operating point, respectively, of the second subset of processor cores.

15. The method of claim 14, wherein:

the first maximum voltage/frequency operating point corresponds to a peak single-thread frequency; and the second maximum voltage/frequency operating point corresponds to a peak multi-thread frequency that is lower than the peak single-thread frequency.

16. The method of claim 10, wherein:

each processor core of the first subset of processor cores is implemented with the different physical characteristic by being implemented using a first plurality of library cells optimized for the higher operating frequency; and each processor core of the second subset of processor cores is implemented using a second plurality of library cells optimized for energy efficiency.

17. The method of claim 10, wherein:

each processor core of the first subset of processor cores is implemented with the different physical characteristic by being implemented using a plurality of block head switches (BHS); and each processor core of the second subset of processor cores is implemented using a plurality of globally distributed head switches (GDHS).

18. A non-transitory computer-readable medium, having stored thereon computer-executable instructions that, when executed, cause a processor device of a processor-based device to:

determine, while only one or more processor cores of a first subset of processor cores of a plurality of processor cores of a core cluster are active, that one or more processor cores of a second subset of processor cores of the plurality of processor cores have become active, wherein:

the core cluster comprises a phase-locked loop (PLL);

the plurality of processor cores are based on a common instruction set architecture (ISA);

each processor core of the plurality of processor cores is configured to operate synchronously based on a same clock signal from the PLL;

each processor core of the first subset of processor cores is implemented with a different physical characteristic relative to the second subset of processor cores; and the different physical characteristic enables a higher operating frequency of each processor core of the first subset of processor cores that that of each processor core of the second subset of processor cores; and responsive to determining that the one or more processor cores of the second subset of processor cores have become active, switch the core cluster from a first dynamic voltage and frequency scaling (DVFS) state to a second DVFS state lower than the first DVFS state.

19. The non-transitory computer-readable medium of claim 18, wherein the computer-executable instructions further cause the processor-based device to:

determine that only the one or more processor cores of the first subset of processor cores are now active among the plurality of processor cores; and responsive to determining that only the one or more processor cores of the first subset of processor cores are now active, switch the core cluster to a third DVFS state higher than the second DVFS state.

* * * * *